United States Patent [19]
Nichol

[11] Patent Number: 5,950,231
[45] Date of Patent: Sep. 7, 1999

[54] MEMORY MANAGER SYSTEM

[75] Inventor: John Nichol, Sawbridgeworth, United Kingdom

[73] Assignee: Northern Telecom Limited, Montreal, Canada

[21] Appl. No.: 08/756,200

[22] Filed: Nov. 25, 1996

[51] Int. Cl.[6] .................................................. G06F 12/00
[52] U.S. Cl. ........................................... 711/170; 711/154
[58] Field of Search ..................... 711/170, 171, 711/154

[56] References Cited

U.S. PATENT DOCUMENTS

| | | | |
|---|---|---|---|
| 5,247,634 | 9/1993 | Cline et al. ............................... | 707/205 |
| 5,577,243 | 11/1996 | Sherwood et al. .......................... | 707/7 |
| 5,625,819 | 4/1997 | Hoffer, Jr. .................................. | 707/202 |
| 5,717,842 | 2/1998 | Ambalavanar et al. ................ | 395/115 |
| 5,721,858 | 2/1998 | White et al. .............................. | 711/203 |
| 5,835,958 | 11/1998 | Long ........................................ | 711/170 |
| 5,835,959 | 11/1998 | McCool ................................... | 711/171 |

*Primary Examiner*—John W. Cabeca
*Assistant Examiner*—Christopher S. Chow
*Attorney, Agent, or Firm*—John D. Crane

[57] ABSTRACT

A memory manager arrangement for use within a memory comprises a memory management structure, a set of memory blocks in which data can be stored under the control of the management structure, and a stack of pointers to free memory blocks within the set of memory blocks. The memory management structure incorporates a first management pointer to the stack of pointers and a second management pointer to a first memory block in the stack whereby to provide automatic allocation of memory blocks on demand. The manager arrangement may be created by an an application prior to the running of that application.

2 Claims, 2 Drawing Sheets

MEMORY MANAGER SYSTEM

This invention relates to an arrangement and method for the management of a memory in a data processing system.

BACKGROUND OF THE INVENTION

In data processing systems there is a general requirement for memory management as new data is stored and old data deleted from a memory, the available memory space can become fragmented. Over a period of time this can lead to the fragmentation of newly stored data with a consequent increase in the time required to retrieve that data from the memory. The conventional approach to this problem is to manage memory via the function calls brk, sbrk, malloc, calloc, realloc, etc. The functions brk and sbrk are low level primitives which are used to change dynamically the amount of space allocated for the calling process's data segment, or memory. These latter two functions are generally viewed as being too primitive for today's systems.

Current applications can use the malloc family of function calls to allocate blocks of memory at run time. Malloc uses sbrk or brk to change the size of the available process memory and then manages the memory as a list of allocated and free blocks of particular sizes. Malloc can provide an application on demand with a block of memory of any size. It does this by maintaining lists of free memory blocks and of their respective sizes so as to return a block which is at least as big as the block requested by the user. Therefore malloc must choose from the available blocks which of those blocks is most appropriate for giving to the application. The implementation of the malloc family of functions is system dependant, it is likely to vary from machine to machine.

This process suffers from the disadvantage that the use of the memory can be inefficient as it is generally necessary to allocate a memory block that is larger than required as any lesser available block will be too small. It is also necessary to expend processor time in the search for and identification of blocks of an appropriate size.

SUMMARY OF THE INVENTION

An object of the invention is to minimise or to overcome this disadvantage.

A further object of the invention is to provide an improved arrangement and method for memory management and allocation of memory capacity.

According to one aspect of the invention there is provided a memory manager arrangement for use within a memory, the arrangement including a memory management structure, a set of data blocks in which data can be stored under the control of the management structure, and a stack of pointers to free data blocks within the set of data blocks, wherein the memory management structure incorporates a first management pointer to the stack of pointers and a second management pointer to a first data block in the stack whereby to provide automatic allocation of data blocks.

According to another aspect of the invention there is provided a method of data storage in a memory including a memory management structure, a set of data blocks in which data can be stored under the control of the management structure, and a stack of pointers to free data blocks within the set of data blocks, the method including providing from the memory management structure a first management pointer to the stack of pointers and a second management pointer to a first data block in the stack whereby to provide automatic allocation of data blocks.

According to a further aspect of the invention there is provided a method of allocating sets of memory blocks for use by an application during execution of that application, the method comprising creating via the application a plurality of memory manager arrangements each comprising a memory management structure, a set of similar memory blocks in which data can be stored under the control of the management structure, and a stack of pointers to free memory blocks within the set of memory blocks, the memory management structure incorporating a first management pointer to the stack of pointers and a second management pointer to a first memory block in the stack whereby to provide automatic allocation of memory blocks, wherein said memory manager arrangements are created prior to running of said application, and wherein each said memory manager arrangement is provided a memory capacity determined by the application at the time of creation of that manager arrangement.

The memory manager arrangement manages memory blocks of the same size only. Therefore, it is not necessary to search available blocks to find one of the correct size. In particular the arrangement allows an application to maintain a series of completely separate lists of memory of the same size and to rapidly access those blocks. Additionally the arrangement allows the application to allocate the memory it requires before it uses that memory rather than delaying allocation until the memory is actually required. The application thus determines the merory requirement prior to run time so that an appropriate memory capacity is mabde available to that application for use during execution of the application.

The memory management arrangement benefits from improved performance due to the simplicity of its algorithm, reduced memory fragmentation (that is management of the memory as a collection of smaller and smaller blocks) and the ability to allocate the applications memory blocks before they are required, reducing the need to dynamically allocate memory whilst the application is executing.

BRIEF DESCRIPTION OF THE DRAWINGS

An embodiment of the invention will now be described with reference to the accompany drawings in which.

DESCRIPTION OF A PREFERRED EMBODIMENT

Figure 1:
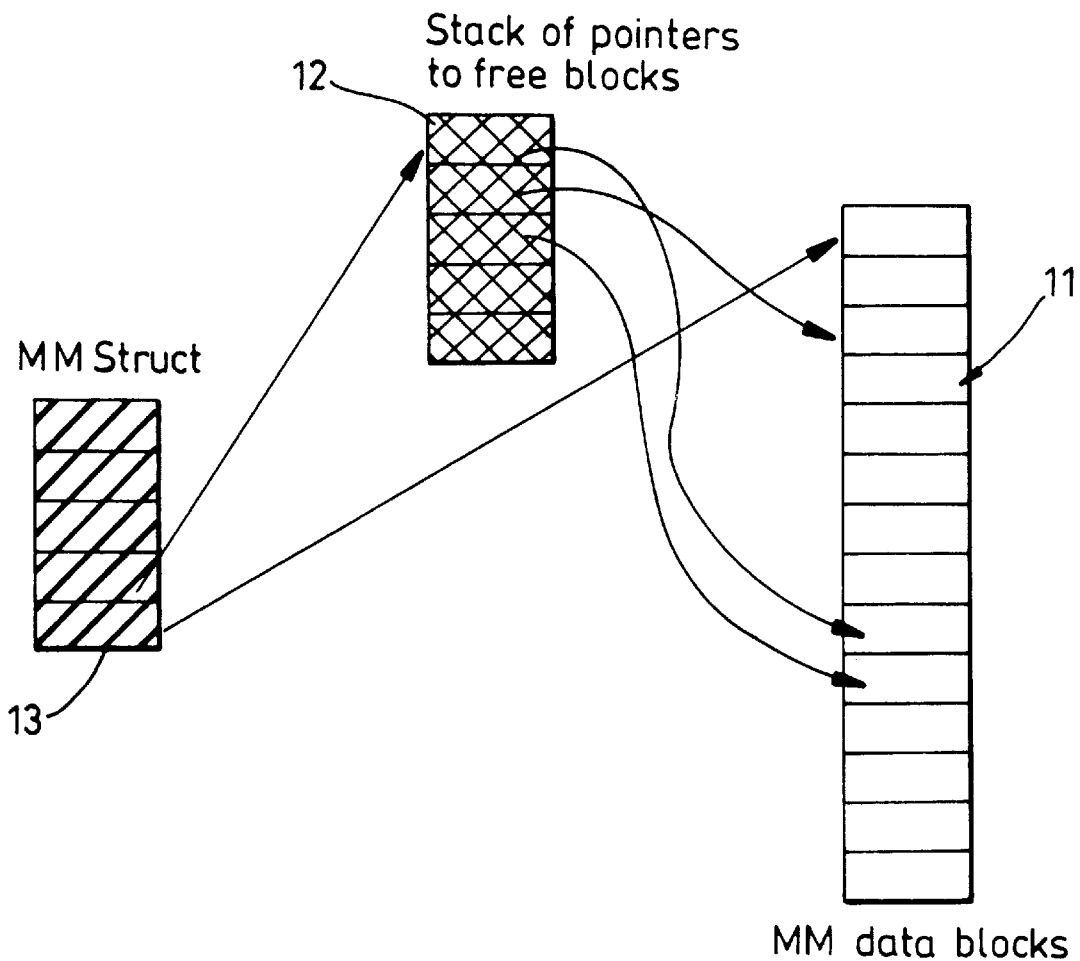
FIG. 1 is a schematic functional diagram of the memory manager arrangement.
Figure 2:
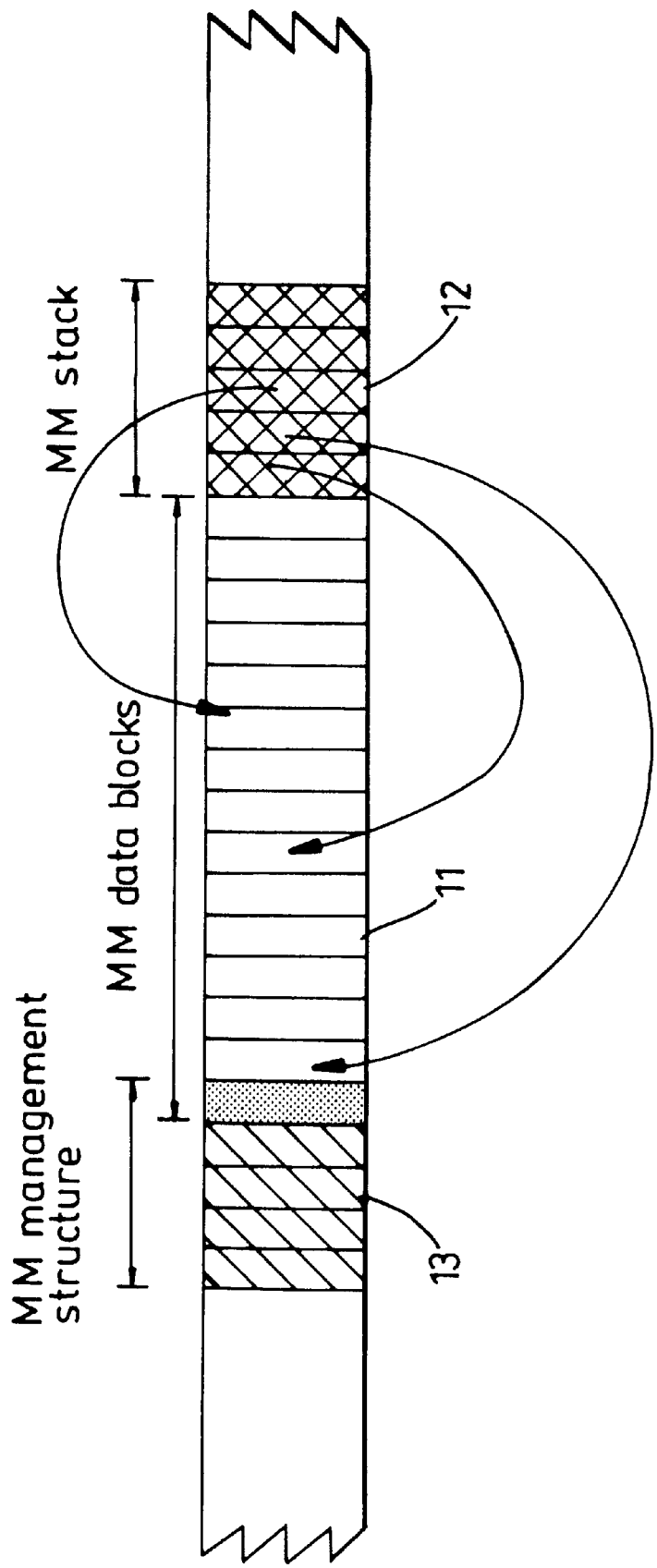
FIG. 2 illustrates the data structure in the memory manager arrangement of FIG. 1.

Referring to the drawings, the memory manager arrangement incorporates a memory which is sufficiently large to accommodate the data blocks 11 being managed. In the memory these data blocks will either be occupied or free, the free blocks being either unfilled or filled with data that is no longer required thus providing space for overwriting with new data. A stack of pointers 12 to those free blocks is maintained and the blocks are allocated via push and pop operations. A memory management structure 13 controls access to the data blocks 11 via the pointer stack 12. The memory management structure of FIG. 1 is represented in memory as a contiguous memory block as shown in FIG. 2 with the management structure 13 followed by the data blocks 11 and the pointer stack 12 at the end of the data blocks.

Conveniently, the memory manager (MM) is represented in the C-programming language by the type ON_Mm. This is a pointer to the structure. ON_Mms are returned from an ON_mm_create function provided via the language.

The S_ON_Mm structure is

```
struct S_ON-Mm {
#ifdef ON_MM_REPORT
    struct S_ON_Mm * mm_next;/* pointer to next MM structure */
    ON_ULong mm_current_size;/*maximum size of MM structure */
    ON_ULong mm_max_size;/* maximum size of MM structure */
    ON_Char mm_name[40];/* identifier for the MM structure */
#endif
    int mm_size;      /* number of static blocks in the mm */
    int mm_blocksize;/* sizeof each block */
    ON_Boolean mm_grow;/* add new blocks dynamically? */
    void ** mm_stack;/* points to a stack of free blocks */
    int mm_stack_index;/* stack pointer */
    void * mm_base;      /* base pointer to actual mem blocks */
};
typedef struct S_ON-Mm * ON_Mm
```

The size field is the number of blocks in the memory management structure, the blocksize field is the size of each individual block. The mm_grow field is used to determine the action which should be taken if the memory management structure has no available blocks on the stack. The mm_stack field of the structure is a void ** and will point to a piece of memory which contains pointers to currently unallocated data blocks. The mm_stack_index field is the offset into the stack area of the next free block. mm_base is the pointer to the memory block from which the data blocks will be allocated.

The order of fields in the S_ON_Mm structure is critical. The mm_base field is assumed by the memory management structure module to be the last field in the structure. In this way the mm_base field is the address of the first data block in the memory management structure. Adding fields after the mm_base field is likely to result in segmentation violations and failure of the memory management structure algorithms to function correctly.

The memory management structure design is based upon the performance benefits which can be gained, by allocating the memory that will be used at run time during initialisation, and by reducing memory fragmentation by managing large blocks of memory.

Each memory manager arrangement that is created has one fixed block size. The block size and number of blocks are specified at memory management structure create (ON_mm_create), along with the Boolean value grow which determines the behaviour of the memory management structure when it has exhausted its supply of available blocks. One final field to the ON_mm_create call is the name parameter, this is only used if the memory management structure module is compiled with the ON_MM_REPORT compile flags defined.

The ON_MM_REPORTS conditional compilation flag is used to allowed additional information to be collated and reported during RNI development. Additional fields are added to the S_ON_Mm structure to allow a memory management structure name, maximum size to be reached and current size information to be stored for reporting by the ON_mm_report function which dumps all the status information for existing memory management structures when called.

Additionally, when the ON_MM_REPORT compile flag is used ON_mm_pop and ON_mm_push are implemented as functions rather than macros, this is to aid debugging and code maintainability. However, it is important to note that this means that two versions of the push and pop functionality are being maintained.

When the memory manager arrangement is created, a memory block of size

```
sizeof (struct S_ON_Mm) + (blocksize * no_of_nodes)
    + (sizeof (char *)* no_of_nodes - 1)
``` is allocated, e.g. using malloc. This allows space for the S_ON_Mm data structure, the memory for the data blocks and room for the stack of free pointers which will be maintained. This is illustrated in FIG. 2. The sum no_of_nodes-1 is needed rather than no_of_nodes because the pointer mm_base points to the first node.

A memory management structure is manipulated by ON_mm_pop and ON_mm-push. This functionality is implemented as macros for efficiency. The algorithms used are relatively simple.

ON_mm_pop—called when memory is to be allocated (malloc)

1. Check the stack index to see if there are any free blocks.
2. If there is a free block then move the stack pointer and return a pointer to the free block
3. Otherwise check if the memory management structure is growable
4. If it is then malloc a new block and return its address or return NULL if malloc failed
5. Otherwise return a NULL pointer The memory manager provides a means to rapidly allocate and deallocate memory in a system. An application is able to create many memory managers each of which creates and maintains only memory blocks of one fixed size. The number and size of the memory blocks in a memory manager is configured by the application. The memory manager will allocate all of the memory blocks in one contiguous piece of memory when the memory manager is created, and the memory manager will then manage that piece of memory. The memory manager maintains a stack of pointers to its free memory blocks. These blocks can then be rapidly pushed and pulled from the stack of free blocks.

The advantages that the memory manager offers are reduced system memory fragmentation, fast memory allocation, and allocation of memory at system initialisation time, ahead of the application using it.

The memory manager can be used in any systems which require dynamic allocation of memory blocks of fixed size. Specifically the memory manager can be used in the provision of a real-time CORBA (Common Object Request Broker Architecture) implementation.

It will be appreciated that the above description is given by way of example only and that, in particular, the technique is in no way limited to the C-programming language. Users of other programming languages will be aware of any modifications required to adapt the technique to those languages.

I claim:

1. A method of memory storage in a memory including a memory management structure, a set of memory blocks in which data can be stored under the control of the management structure, and a stack of pointers to free memory blocks within the set of memory blocks, the method comprising providing from the memory management structure a first management pointer to the stack of pointers and a second management pointer to a first memory block in the stack to provide automatic allocation of data blocks, wherein the memory management structure is associated with an application, the number and capacity of said memory blocks is configured by that application, and a required memory capacity is determined by the application and a corresponding set of memory blocks is configured prior to running of the application.

2. A method of allocating sets of memory blocks for use by an application during execution of that application, the method comprising creating via the application a plurality of memory manager arrangements each comprising a memory management structure, a set of similar memory blocks in which data can be stored under the control of the management structure, and a stack of pointers to free memory blocks within the set of memory blocks, the memory management structure incorporating a first management pointer to the stack of pointers and a second management pointer to a first memory block in the stack whereby to provide automatic allocation of memory blocks, wherein said memory manager arrangements are created prior to running of said application, and wherein each said memory manager arrangement is provided a memory capacity determined by the application at the time of creation of that manager arrangement.

* * * * *